(12) United States Patent
Leinweber et al.

(10) Patent No.: US 7,893,009 B2
(45) Date of Patent: *Feb. 22, 2011

(54) POLYMERS AND THEIR PRODUCTION AND USE AS GAS HYDRATE INHIBITORS

(75) Inventors: Dirk Leinweber, Schwalbach (DE); Michael Feustel, Koengernheim (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 504 days.

This patent is subject to a terminal disclaimer.

(21) Appl. No.: 11/884,223

(22) PCT Filed: Feb. 1, 2006

(86) PCT No.: PCT/EP2006/000864

§ 371 (c)(1),
(2), (4) Date: Aug. 10, 2007

(87) PCT Pub. No.: WO2006/084613

PCT Pub. Date: Aug. 17, 2006

(65) Prior Publication Data

US 2008/0113878 A1    May 15, 2008

(30) Foreign Application Priority Data

Feb. 12, 2005   (DE) ................. 10 2005 006 421

(51) Int. Cl.
| | |
|---|---|
| C04B 33/04 | (2006.01) |
| C09K 8/60 | (2006.01) |
| C09K 8/54 | (2006.01) |
| C23G 1/06 | (2006.01) |
| C08G 69/08 | (2006.01) |

(52) U.S. Cl. ............... 507/90; 507/260; 507/266; 507/267; 507/268; 528/310

(58) Field of Classification Search ........... 507/90, 507/239, 260, 266, 267, 268; 528/310
See application file for complete search history.

(56) References Cited

U.S. PATENT DOCUMENTS

| | | | |
|---|---|---|---|
| 3,224,975 A | | 12/1965 | Hinkamp |
| 3,255,112 A | * | 6/1966 | Hoffman et al. ........... 508/263 |
| 4,079,041 A | | 3/1978 | Baumann |
| 4,127,493 A | | 11/1978 | Elliott et al. |
| 4,196,091 A | | 4/1980 | Schlicht |
| 4,446,301 A | | 5/1984 | Belote |
| 4,774,255 A | | 9/1988 | Black et al. |
| 5,244,878 A | | 9/1993 | Sugier |
| 5,432,292 A | | 7/1995 | Sloan |
| 5,583,273 A | | 12/1996 | Colle et al. |
| 5,777,046 A | | 7/1998 | Boeckh et al. |
| 5,879,561 A | | 3/1999 | Klomp et al. |
| 5,900,516 A | | 5/1999 | Talley |
| 6,093,862 A | | 7/2000 | Sinquin |
| 6,121,033 A | | 9/2000 | Tadros |
| 6,417,417 B1 | | 7/2002 | Sinquin |
| 6,566,309 B1 | | 5/2003 | Klug et al. |
| 6,855,671 B2 | | 2/2005 | Norfleet et al. |
| 6,867,262 B1 | | 3/2005 | Angel |
| 6,894,007 B2 | | 5/2005 | Klug et al. |
| 7,615,102 B2 | | 11/2009 | Leinweber et al. |
| 2002/0002116 A1 | | 1/2002 | Klug |
| 2003/0057158 A1 | | 3/2003 | Klomp |
| 2004/0163306 A1 | | 8/2004 | Dahlmann et al. |
| 2004/0164278 A1 | | 8/2004 | Dahlmann |
| 2009/0042747 A1 | | 2/2009 | Leinweber et al. |
| 2009/0043146 A1 | | 2/2009 | Leinweber et al. |
| 2009/0054268 A1 | | 2/2009 | Leinweber et al. |
| 2009/0124786 A1 | | 5/2009 | Feustel et al. |
| 2010/0213408 A1 | | 8/2010 | Feustel et al. |

FOREIGN PATENT DOCUMENTS

| | | |
|---|---|---|
| DE | 1215436 | 4/1966 |
| DE | 19935063 | 2/2001 |

(Continued)

OTHER PUBLICATIONS

International Search Report PCT/EP2006/00864, May 10, 2006.

(Continued)

*Primary Examiner*—Timothy J. Kugel
*Assistant Examiner*—Atnaf Admasu
(74) *Attorney, Agent, or Firm*—Tod A. Waldrop

(57) ABSTRACT

The invention relates to polymers with a mean molecular weight of between 500 and 500,000 g/mol that can be produced as follows: A) reaction of a compound of formula 1, (1)

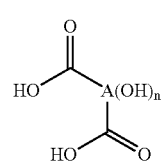

in which n stands for 0, 1 or 2 and A for an arbitrarily substituted $C_1$-$C_{40}$ group with a compound of the formula 2 $B(OH)_m$ in which m is from 2 to 10 and B is a represents an arbitrarily substituted $C_2$-$C_{40}$ group, B) subsequently reaction of the product thus obtained with a nitrogen-containing carboxylic acid which comprises from 1 to 20 carbon atoms, where the molar ratio between the number of free OH groups of the polyester obtained in step A and the nitrogen-containing carboxylic acid is between 1:0.1 and 1:1. The polymers are used to inhibit gas hydrate formation.

7 Claims, No Drawings

FOREIGN PATENT DOCUMENTS

| | | |
|---|---|---|
| DE | 10259815 | 7/2004 |
| DE | 102005054037 | 5/2007 |
| DE | 19642656 | 1/2008 |
| EP | 0069512 | 1/1983 |
| EP | 0323774 | 7/1989 |
| EP | 0896123 | 10/1999 |
| EP | 1048892 | 11/2000 |
| GB | 1323061 | 7/1973 |
| WO | 9325798 | 12/1993 |
| WO | 9412761 | 6/1994 |
| WO | 0216468 | 2/2002 |
| WO | WO2004/056885 | 7/2004 |
| WO | WO2007/054225 | 5/2007 |
| WO | WO2007/054226 | 5/2007 |

OTHER PUBLICATIONS

English Lang. Abstract JP2004 238763, Aug. 26, 2004.
Vasylev, M et al., "New Heterogeneous Polyoxometalate Based Mesoporous Catalysts For Hydrogen Peroxide Mediated Oxidation Reactions", J. Am. Chem. Soc., (2004), vol. 126, pp. 884-890.
Copending U.S. Appl. No. 11/885,611, filed Aug. 10, 2007.
Copending U.S. Appl. No. 11/884,222, filed Aug. 10, 2007.
English Lang. Abstract and Machine Trans. of DE19642656, Apr. 23, 1998.
English Lang. Abstract and Machine Trans. of EP0323774, Jul. 12, 1998.
English Lang. Translation of IPER PCT/EP2006/000864, Jan. 15, 2008.
English Abstract for WO 2004/056885.
International Search Report for EP 08 01 3825, dated Nov. 11, 2008.
German Office Action for DE 10 2007 037 016.6, dated Mar. 3, 2008.
International Search Report for PCT/EP2006/001394, dated May 10, 2006.
English Lang. Translation of IPER PCT/EP2006/001394, dated Jun. 28, 2006.
International Search Report for PCT/EP2006/000983, dated May 18, 2006.
International Preliminary Examination Report for PCT/EP2006/000983, dated Jun. 26, 2007.
English Abstract for DE1215436.

* cited by examiner

POLYMERS AND THEIR PRODUCTION AND USE AS GAS HYDRATE INHIBITORS

The present invention relates to polymers consisting of substituted polyesters, to their preparation and to their use, and to a process for inhibiting nucleation, growth and/or agglomeration of gas hydrates by adding an effective amount of an inhibitor comprising substituted polyesters to a polyphasic mixture which consists of water, gas and possibly condensate and tends to form hydrates, or to a drilling fluid which tends to form gas hydrates.

Gas hydrates are crystalline inclusion compounds of gas molecules in water which form under certain temperature and pressure conditions (low temperature and high pressure). The water molecules form cage structures around the appropriate gas molecules. The lattice structure formed from the water molecules is thermodynamically unstable and is only stabilized by the incorporation of guest molecules. Depending on pressure and gas composition, these icelike compounds can exist even beyond the freezing point of water (up to above 25° C.).

In the crude oil and natural gas industry, great significance attaches in particular to the gas hydrates which form from water and the natural gas constituents methane, ethane, propane, isobutane, n-butane, nitrogen, carbon dioxide and hydrogen sulfide. Especially in modern natural gas extraction, the existence of these gas hydrates constitutes a great problem, especially when wet gas or multiphasic mixtures of water, gas and alkane mixtures are subjected to low temperatures under high pressure. As a consequence of their insolubility and crystalline structure, the formation of gas hydrates leads here to the blockage of a wide variety of extraction equipment such as pipelines, valves or production equipment in which wet gas or multiphasic mixtures are transported over relatively long distances at relatively low temperatures, as occurs especially in colder regions of the earth or on the seabed.

Moreover, gas hydrate formation can also lead to problems in the course of the drilling operation to develop new gas or crude oil deposits at the appropriate pressure and temperature conditions by the formation of gas hydrates in the drilling fluids.

In order to prevent such problems, gas hydrate formation in gas pipelines, in the course of transport of multiphasic mixtures or in drilling fluids, can be suppressed by using relatively large amounts (more than 10% by weight, based on the weight of the aqueous phase) of lower alcohols such as methanol, glycol or diethylene glycol. The addition of these additives has the effect that the thermodynamic limit of gas hydrate formation is shifted to lower temperatures and higher pressures (thermodynamic inhibition). However, the addition of these thermodynamic inhibitors causes serious safety problems (flashpoint and toxicity of the alcohols), logistical problems (large storage tanks, recycling of these solvents) and accordingly high costs, especially in offshore extraction.

Attempts are therefore now being made to replace thermodynamic inhibitors by adding additives in amounts of <2% in temperature and pressure ranges in which gas hydrates can form. These additives either delay gas hydrate formation (kinetic inhibitors) or keep the gas hydrate agglomerates small and therefore pumpable, so that they can be transported through the pipeline (agglomerate inhibitors or antiagglomerants). The inhibitors used either prevent nucleation and/or the growth of the gas hydrate particles, or modify the hydrate growth in such a way that relatively small hydrate particles result.

The gas hydrate inhibitors which have been described in the patent literature, in addition to the known thermodynamic inhibitors, are a multitude of monomeric and also polymeric substance classes which are kinetic inhibitors or antiagglomerants. Of particular significance in this context are polymers having a carbon backbone which contain both cyclic (pyrrolidone or caprolactam radicals) and acyclic amide structures in the side groups.

For instance, WO-94/12761 discloses a process for kinetically inhibiting gas hydrate formation by the use of polyvinyllactams having a molecular weight of $M_w$>40 000 D, and WO-93/25798 discloses such a process using polymers and/or copolymers of vinylpyrrolidone having a molecular weight of $M_w$>5000 to 40 000 D.

EP-A-0 896 123 discloses gas hydrate inhibitors which may comprise copolymers of alkoxylated methacrylic acid without alkyl end capping and cyclic N-vinyl compounds.

EP-A-1 048 892 describes the use of additives for improving the flow of aqueous petroleum, which may comprise polyvinyl alcohol or partly hydrolyzed polyvinyl acetate as a nucleating agent for gas hydrates in conjunction with suitable dispersants. The document does not make any further statement regarding the polyvinyl alcohol or the partly hydrolyzed polyvinyl acetate, except that their molecular weight should be below 50 000 g/mol.

U.S. Pat. No. 5,244,878 describes a process for retarding the formation or reducing the tendency to form gas hydrates. To this end, polyols which are esterified with fatty acids or alkenylsuccinic anhydrides are used. The compounds prepared do not have any amino acid functions which can interact with clathrates (cage molecules).

The additives described have only limited efficacy as kinetic gas hydrate inhibitors and/or antiagglomerants, have to be used with coadditives, or are unobtainable in a sufficient amount or obtainable only at high cost.

In order to be able to use gas hydrate inhibitors even in the case of greater cooling than currently possible, i.e. further within the hydrate region, a further enhancement of action is required in comparison to the prior art hydrate inhibitors. In addition, improved products are desired with regard to their biodegradability and toxicity.

It was thus an object of the present invention to find improved additives which both slow the formation of gas hydrates (kinetic inhibitors) and keep gas hydrate agglomerates small and pumpable (antiagglomerants), in order thus to ensure a broad spectrum of application with high potential action. Furthermore, they should be capable of replacing the currently used thermodynamic inhibitors (methanol and glycols), which cause considerable safety problems and logistical problems.

As has now been found, surprisingly, both water-soluble and oil-soluble substituted polyesters are suitable as gas hydrate inhibitors. According to the structure, these polyesters may both retard nucleation and the growth of gas hydrates (kinetic gas hydrate inhibitors) and suppress the agglomeration of gas hydrates (antiagglomerants).

The invention therefore provides polymers having a number-average molecular weight of from 500 to 500 000 g/mol, preparable by A) reacting a compound of the formula 1

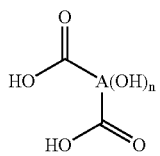

(1)

in which n is 0, 1 or 2 and A is a $C_1$-$C_{40}$ radical substituted as desired with a compound of the formula 2

$$B(OH)_m \quad (2)$$

in which m is from 2 to 10 and B is a $C_2$-$C_{40}$ radical substituted as desired, B) subsequently reacting the product thus obtained with a nitrogen-containing carboxylic acid which comprises from 1 to 20 carbon atoms, where the molar ratio between the number of free OH groups of the polyester obtained in step A and the nitrogen-containing carboxylic acid is between 1:0.1 and 1:1.

The invention further provides a process for inhibiting the formation of gas hydrates by adding polymers as defined above in amounts of from 0.01 to 2% by weight to an aqueous phase, in which gas hydrate formation is to be prevented, in contact with a gaseous, liquid or solid organic phase.

The invention further provides for the use of the inventive polymers in amounts of from 0.01 to 2% by weight for preventing the formation of gas hydrates in aqueous phases which are in contact with a gaseous, liquid or solid organic phase.

A is preferably an alkylene radical having from 2 to 6 carbon atoms.

B is preferably an alkylene radical having from 2 to 6 carbon atoms.

m is preferably from 2 to 6.

The inventive polymers are preparable by processes known from the literature by condensing substituted dicarboxylic acids with diols or polyols and then esterifying the free OH groups with an N-containing carboxylic acid or a mixture of an N-containing carboxylic acid and a fatty acid having from 6 to 30 carbon atoms or a carboxylic acid containing aromatic radicals.

The molar ratio of the compounds of the formulae 1 and 2 employed in the reaction is preferably between 20:80 and 80:20, in particular between 30:70 and 70:30.

Subsequently, the resulting polyester is reacted with an N-containing carboxylic acid or the mixture of one with a fatty acid having from 6 to 30 carbon atoms or a carboxylic acid containing aromatic radicals. The proportion of the N-containing carboxylic acid, when such a mixture is used, is preferably at least 30 mol %, in particular 50 mol %.

In a preferred embodiment, the compounds of the formula (1) are the following dicarboxylic acids: tartaric acid, malic acid, maleic acid, fumaric acid, malonic acid, adipic acid, succinic acid, itaconic acid, phthalic acid.

In a preferred embodiment, the compounds of the formula (2) are the following diols or polyols: glycerol, diglycerol, triglycerol, polyglycerol, trimethylolpropane, pentaerythritol, sorbitol, ethylene glycol, diethylene glycol, propylene glycol, dipropylene glycol, butanediol.

Preferred N-containing carboxylic acids are: pyroglutamic acid, glutamic acid, aceturic acid, aspartic acid.

When fatty acids are also used in addition to N-containing carboxylic acids, preference is given to the following fatty acids: coconut fatty acid, tall oil fatty acid, oleic acid, isooleic acid, elaidic acid, stearic acid, palmitic acid, lauric acid, and a mixture containing 15-30% by weight of palmitic and stearic acid, 40-60% by weight of isooleic acid, and 15-30% by weight of oleic acid and elaidic acid.

The preparation of polyesters is known in the prior art and is effected by uncatalyzed or acid-catalyzed condensation of the particular dicarboxylic acid with the appropriate diol or polyol. The reaction temperature is generally between 100 and 250° C., preferably from 120 to 150° C. The reaction can be performed at atmospheric pressure or reduced pressure. Catalyzing acids include, for example, HCl, $H_2SO_4$, sulfonic acids, $H_3PO_4$ or acidic ion exchangers, which are used in amounts of from 0.1 to 5% by weight, based on the weight of the reaction mixture. The condensation takes generally from 3 to 10 hours.

The subsequent esterification with N-containing carboxylic acids or a mixture of N-containing and non-N-containing carboxylic acids is likewise performed uncatalyzed or with acidic catalysis as known in the prior art at temperatures of from 120 to 250° C.

The molecular weight of the inventive polymers is preferably between 500 and 500 000 g/mol, more preferably between 1000 to 50 000 g/mol.

The polymers can be used alone or in combination with other known gas hydrate inhibitors. In general, a sufficient amount of the inventive gas hydrate inhibitor is added to the system which tends to form hydrates that sufficient inhibition is obtained under the given pressure and temperature conditions. The inventive gas hydrate inhibitors are generally used in amounts between 0.01 and 2% by weight (based on the weight of the aqueous phase), corresponding to 100-20 000 ppm, preferably from 0.02 to 1% by weight. When the inventive gas hydrate inhibitors are used in a mixture with other gas hydrate inhibitors, the concentration of the mixture is from 0.01 to 2 or from 0.02 to 1% by weight in the aqueous phase.

The polymers are preferably used as gas hydrate inhibitors in water-miscible alcoholic solvents, for example methanol, ethanol, propanol, butanol, ethylene glycol, and oxyethylated monoalcohols such as butylglycol, isobutylglycol, butyldiglycol.

EXAMPLES

Preparation of the Polymers

Example 1

Preparation of a Tartaric Acid-Glycerol Polyester (Variant 1)

In a 500 ml four-neck flask with stirrer, thermometer, nitrogen purge and distillation system, 120 g of L-tartaric acid, 96 g of glycerol and 2.2 g of p-toluenesulfonic acid were mixed and heated to 140° C. Within 10 h at 140-145° C., approx. 24 ml of water were distilled off. The resulting polyester has an acid number of 96 mg KOH/g.

Example 2

Preparation of a Tartaric Acid-Glycerol Polyester (Variant 2)

In a 500 ml four-neck flask with stirrer, thermometer, nitrogen purge and distillation system, 120 g of L-tartaric acid, 96 g of glycerol and 2.2 g of p-toluenesulfonic acid were mixed and heated to 140° C. Within 4 h at 140-145° C., approx. 20 ml of water were distilled off. A further 6 ml of water were then distilled off at a reduced pressure of approx. 300 mbar for 3 h. The resulting polyester has an acid number of 60 mg KOH/g.

Example 3

Preparation of a Malic Acid-Glycerol Polyester

In a 500 ml four-neck flask with stirrer, thermometer, nitrogen purge and distillation system, 134 g of malic acid, 120 g of glycerol and 2.6 g of p-toluenesulfonic acid were mixed and heated to 130° C. Within 12 h at 130° C., approx. 32 ml of water were distilled off. The resulting polyester has an acid number of 98 mg KOH/g.

Example 4

Preparation of a Tartaric Acid-Ethylene Glycol Polyester

In a 500 ml four-neck flask with stirrer, thermometer, nitrogen purge and distillation system, 150 g of L-tartaric acid, 81 g of ethylene glycol and 2.3 g of p-toluenesulfonic acid were mixed and heated to 140° C. Within 12 h at 140-145° C., approx. 34 ml of water were distilled off. The resulting polyester has an acid number of 104 mg KOH/g.

Example 5

Reaction of a Tartaric Acid-Glycerol Polyester with Pyroglutamic Acid

A 500 ml four-neck flask with stirrer, thermometer, nitrogen purge and distillation system was initially charged with 100 g of tartaric acid-glycerol polyester from example 1. 90 g of pyroglutamic acid were then added and the reaction mixture was heated at 180-190° C. while distilling off the water of reaction for 8 h, in the course of which approx. 10 ml of water were obtained. The resulting polyester had an acid number of 57 mg KOH/g.

Example 6

Reaction of a Tartaric Acid-Glycerol Polyester with Glutamic Acid

A 500 ml four-neck flask with stirrer, thermometer, nitrogen purge and distillation system was initially charged with 100 g of tartaric acid-glycerol polyester from example 2. 80 g of glutamic acid were then added and the reaction mixture was heated at 170-180° C. while distilling off the water of reaction for 8 h, in the course of which approx. 15 ml of water were obtained. The resulting polyester had an acid number of 48 mg KOH/g.

Example 7

Reaction of a Tartaric Acid-Glycerol Polyester with Pyroglutamic Acid and Coconut Fatty Acid A 500 ml four-neck flask with stirrer, thermometer, nitrogen purge and distillation system was initially charged with 100 g of tartaric acid-glycerol polyester from example 1. 50 g of pyroglutamic acid and 40 g of coconut fatty acid were then added and the reaction mixture was heated at 180-190° C. while distilling off the water of reaction for 8 h, in the course of which approx. 11 ml of water were obtained. The resulting polyester had an acid number of 53 mg KOH/g.

Example 8

Reaction of a Tartaric Acid-Glycerol Polyester with Glutamic Acid and Coconut Fatty Acid A 500 ml four-neck flask with stirrer, thermometer, nitrogen purge and distillation system was initially charged with 100 g of tartaric acid-glycerol polyester from example 2. 40 g of glutamic acid and 40 g of coconut fatty acid were then added and the reaction mixture was heated at 170-180° C. while distilling off the water of reaction for 8 h, in the course of which approx. 16 ml of water were obtained. The resulting polyester had an acid number of 45 mg KOH/g.

Efficacy of the Polymers as Gas Hydrate Inhibitors

To investigate the inhibiting action of the polyesters, a stirred steel autoclave with temperature control, pressure and torque sensor with capacity 450 ml was used. For investigations of kinetic inhibition, the autoclave was filled with distilled water and gas in a volume ratio of 20:80; for investigations of agglomerate inhibition, condensate was additionally added. Finally, 90 bar of natural gas were injected. Proceeding from a starting temperature of 17.5° C., the autoclave was cooled to 2° C. within 2 h, then stirred at 2° C. for 18 h and heated back to 17.5° C. within 2 h. At first, a pressure decrease corresponding to the thermal compression of the gas is observed. When the formation of gas hydrate nuclei occurs during the cooling time, the pressure measured falls, and a rise in the torque measured and a slight increase in the temperature are observed. Without inhibitors, further growth and increasing agglomeration of the hydrate nuclei lead rapidly to a further rise in the torque. When the mixture is heated, the gas hydrates decompose, so that the starting state of the experimental series is attained.

The measure used for the inhibiting action of the polymer is the time from the attainment of the minimum temperature of 2° C. until the first gas absorption ($T_{ind}$) or the time until the torque rises ($T_{agg}$). Long induction times or agglomeration times indicate an effect as a kinetic inhibitor. The torque measured in the autoclave serves, in contrast, as a parameter for the agglomeration of the hydrate crystals. In the case of a good antiagglomerant, the torque which builds up after gas hydrates have formed is significantly reduced compared to the blank value. In the ideal case, the snowlike, fine hydrate crystals form in the condensate phase, do not agglomerate and thus do not lead to blockage of the installations serving for gas transport and for gas extraction.

Test Results

Composition of the natural gas used:

methane 87.6%, ethane 1.26%, propane 0.08%, butane 0.02%, carbon dioxide 0.35%, nitrogen 10.61%.

Cooling below the equilibrium temperature of hydrate formation at 90 bar: 8.5° C.

The comparative substance used was a commercially available gas hydrate inhibitor based on polyvinylpyrrolidone.

The dosage in all tests was 5000 ppm based on the water phase.

| Polyester from example | $T_{ind}$ (h) | $T_{agg}$ (h) |
|---|---|---|
| blank value | 0 | 0 |
| 5 | 14.2 | 14.2 |
| 6 | 12.1 | 12.3 |
| 7 | 10.5 | 11.0 |
| 8 | 11.0 | 11.8 |
| comparison | 3.0 | 3.1 |

As can be seen from the above test results, the inventive polyesters are effective as kinetic hydrate inhibitors, and show a significant improvement over the prior art.

In order to test the action as agglomerate inhibitors, the test autoclave used above was initially charged with water and white spirit (20% of the volume in a ratio of 1:2) and, based on the water phase, 5000 ppm of the particular additive were added.

At an autoclave pressure of 90 bar and a stirrer speed of 5000 rpm, the temperature was cooled from initially 17.5° C. to 2° C. within 2 hours, then the autoclave was stirred at 2° C. for 16 hours and warmed up again. The agglomeration time until the occurrence of gas hydrate agglomerates and the torque on the stirrer which occurred at the time, which is a measure of the agglomeration of the gas hydrates, were measured.

The comparative substance employed was a commercially available antiagglomerant (quaternary ammonium salt).

| Polyester from example | $T_{agg}$ (h) | $M_{max}$ (Ncm) |
|---|---|---|
| blank value | 0.1 | 15.9 |
| 5 | 8.5 | 1.2 |
| 6 | 9.1 | 1.4 |
| 7 | 12.1 | 0.9 |
| 8 | 11.2 | 1.0 |
| comparison | 2.2 | 3.7 |

As can be seen from these examples, the torques measured are greatly reduced in comparison to the blank value in spite of gas hydrate formation. This suggests significant agglomerate-inhibiting action of the inventive products. In addition, the products, under the test conditions, also have significant action as kinetic inhibitors. All examples show significantly better performance than the commercially available antiagglomerant (comparison=state of the art).

The invention claimed is:

1. A process for inhibiting gas hydrate formation in an aqueous phase which is in contact with a gaseous, liquid or solid organic phase, said process comprising adding to the aqueous phase from 0.01 to 2% by weight a polymer having a number-average molecular weight of from 500 to 500 000 g/mol, obtained by a) reacting a compound of formula 1

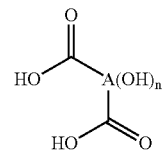

in which n is 0, 1 or 2 and A is an optionally substituted $C_1$-$C_{40}$ radical with a compound of formula 2

$$B(OH)_m \quad (2)$$

in which m is from 2 to 10 and B is an optionally substituted $C_2$-$C_{40}$ radical to provide a polyester, and b) subsequently reacting the product thus obtained with a nitrogen-containing carboxylic acid which comprises from 1 to 20 carbon atoms, where the molar ratio between the number of free OH groups of the polyester obtained in step a and the nitrogen-containing carboxylic acid is between 1:0.1 and 1:1.

2. The process of claim 1, in which the compound of the formula 1 is tartaric acid, malic acid, maleic acid, fumaric acid, malonic acid, adipic acid, succinic acid or phthalic acid.

3. The process of claim 1, in which the compound of the formula 2 is glycerol, diglycerol, triglycerol, polyglycerol, trimethylolpropane, pentaerythritol, sorbitol, ethylene glycol, diethylene glycol, propylene glycol, dipropylene glycol or butanediol.

4. The process of claim 1, in which the nitrogen-containing carboxylic acid is pyroglutamic acid, glutamic acid, aceturic acid or aspartic acid.

5. The process of claim 1, where the molecular weight of the polymer is between 1000 and 50 000 g/mol.

6. The process of claim 1, in which the polyester of step a) is reacted in step b) with a mixture of one or more nitrogen-containing carboxylic acids or with a $C_6$-$C_{30}$ fatty acid or with a carboxylic acid having an aromatic radical.

7. A polymer having a number-average molecular weight of from 500 to 500 000 g/mol, obtained by a) reacting a compound of the formula 1

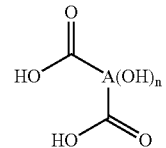

in which n is 1 or 2 and A is a $C_1$-$C_{40}$ radical, optionally substituted, with a compound of the formula 2

$$B(OH)_m \quad (2)$$

in which m is from 2 to 10 and B is a $C_2$-$C_{40}$ radical, optionally substituted, to provide a polyester, b) subsequently reacting the polyester with a nitrogen-containing carboxylic acid which comprises from 1 to 20 carbon atoms, where the molar ratio between the number of free OH groups of the polyester obtained in step a) and the nitrogen-containing carboxylic acid is between 1:0.1 and 1:1.

* * * * *